No. 715,723.  
Patented Dec. 9, 1902.

W. C. WOOD.
PNEUMATIC SPRING FOR VEHICLES.
(Application filed Apr. 19, 1902.)

(No Model.)

Witnesses  
W. C. Wood, Inventor.  
by C. A. Snow & Co.  
Attorneys

UNITED STATES PATENT OFFICE.

WILLIAM CHARLES WOOD, OF WETUMPKA, ALABAMA.

PNEUMATIC SPRING FOR VEHICLES.

SPECIFICATION forming part of Letters Patent No. 715,723, dated December 9, 1902.

Application filed April 19, 1902. Serial No. 103,832. (No model.)

*To all whom it may concern:*

Be it known that I, WILLIAM CHARLES WOOD, a citizen of the United States, residing at Wetumpka, in the county of Elmore and State of Alabama, have invented a new and useful Pneumatic Spring for Vehicles, of which the following is a specification.

This invention relates to certain improvements in vehicle-springs, and has for its principal object to provide an improved form of pneumatic spring for the support of the body of the vehicle, as more fully described hereinafter.

Figure 1:
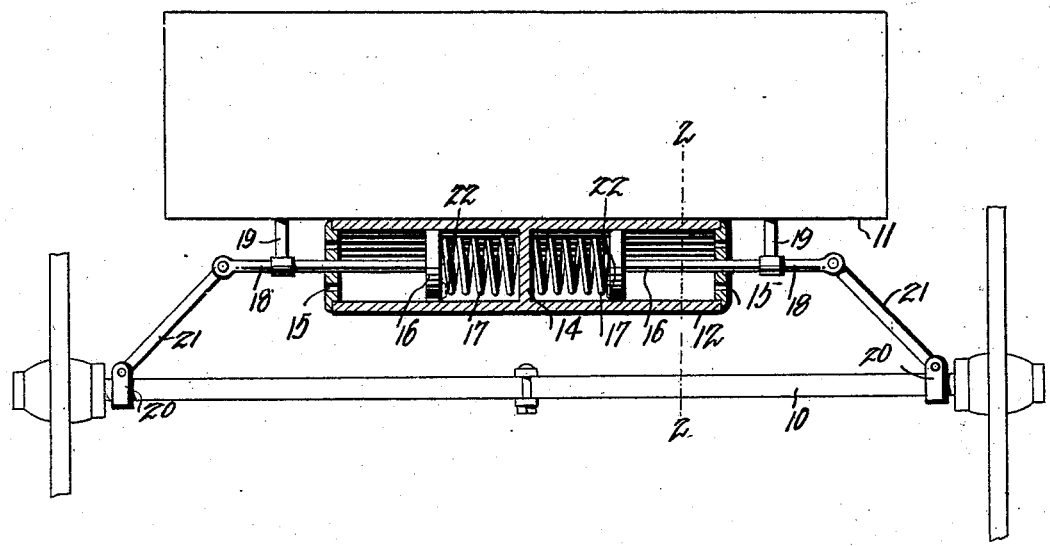
Figure 2:
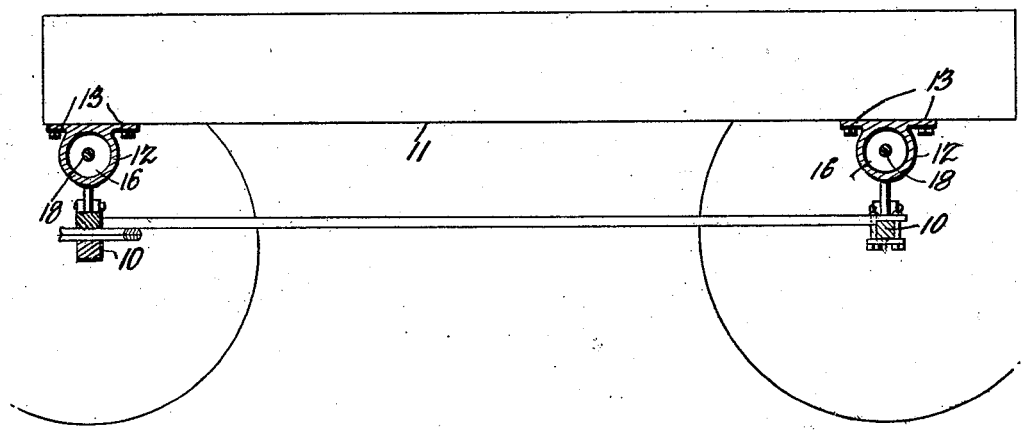

In the accompanying drawings, Figure 1 is a transverse sectional elevation of a portion of a vehicle body and axle, illustrating the application thereto of a spring constructed in accordance with my invention. Fig. 2 is a longitudinal sectional elevation of the same on the line 2 2 of Fig. 1.

Referring to the drawings, 10 designates the axles of a vehicle—such, for instance, as a buggy, wagon, or automobile—and 11 represents the lower portion of the body of such vehicle. Immediately over each of the axles is a double cylinder 12, having integral flanges 13, through which are passed bolts or screws for securing the same to the bottom of the vehicle. The cylinder, which is of a diameter and length proportioned to the weight of the vehicle, is provided with a centrally-disposed partition which divides it into two chambers, each provided with perforated heads 15 to permit the free ingress and egress of air. In each of the chambers is a piston 16, provided with suitable packing in order to form an airtight chamber between the piston and the central partition 14, and in each of such chambers is a compression-spring 17, extending between the piston and partition and normally tending to force the pistons in the direction of the perforated heads. Each piston is provided with a piston-rod 18, which passes through a suitable guide or hanger 19, depending from the bottom of the vehicle, said hanger being situated at a suitable distance from the end of the piston-rod to permit free inward movement of the piston and rod under pressure.

Near each end of the axle 10 is secured a pair of lugs 20, between which is pivoted one end of a link 21, the opposite end of said link being pivotally connected to the outer end of the piston-rod 18.

The operation of the device will be readily understood. The distance between the opposite ends of the two piston-rods is considerably less than the distance between the pivot-lugs 20 on the axle, so that any pressure or strain tending to depress the vehicle-body or elevate the axle will tend to force the pistons 16 toward each other against the stress of the springs 17 and the volume of air contained in the inclosed air-chambers. When the pressure is released, the expansion of the air will force the pistons to reassume their normal condition.

In some cases the pistons may be provided with inwardly-opening flap-valves 22, as indicated by dotted lines in Fig. 1, in order to admit air to the chambers in the event of excessive outward movement of the pistons.

While the construction herein described, and illustrated in the accompanying drawings, is the preferred form of the device, it is obvious that various changes in the form, proportion, size, and minor details of the structure may be made without departing from the spirit or sacrificing any of the advantages of the invention.

Having thus described my invention, what I claim is—

1. A vehicle-spring comprising in combination, a pair of air-chambers secured to the body of the vehicle and closed at their inner ends, pistons disposed in said chambers and adapted to compress air therein, piston-rods carrying the pistons, means for guiding said piston-rods, and links pivotally connecting the vehicle-axle to said piston-rods.

2. A vehicle-spring comprising in combination, a pair of air-chambers closed at one end and secured to the body of the vehicle in a plane parallel with the vehicle-axle, pistons in said chambers, piston-rods carrying the pistons, piston-rod-guiding means arranged externally of the chambers, and links pivotally connecting the vehicle-axle to said piston-rods.

3. A vehicle-spring, comprising in combination a double cylinder arranged parallel with the vehicle-axle and having perforated ends and provided with a centrally-disposed partition forming a closed inner end for both cylinders, pistons arranged in said cylinders and forming, in connection with the cylinders and partition, two oppositely-disposed air-compression chambers, springs extending between the partition and the pistons, piston-rods connected to the piston, a vehicle-axle, and links connecting said vehicle-axle to the piston-rods.

4. A vehicle-spring, comprising in combination, a double cylinder having perforated heads at the opposite ends, the adjacent ends of the cylinders being closed and separated from each other by a central partition, means for securing said cylinder to the vehicle-body in a plane parallel with the vehicle-axle, pistons disposed in said cylinders, hangers depending from the vehicle-body, piston-rods connected to the piston and guided by said hangers, and links pivotally connecting the axle and the piston-rods.

In testimony that I claim the foregoing as my own I have hereto affixed my signature in the presence of two witnesses.

WILLIAM CHARLES WOOD.

Witnesses:
   J. M. HOLLEY,
   L. C. SMITH.